United States Patent Office 3,185,694
Patented May 25, 1965

3,185,694
PROCESS FOR PREPARING QUINACRIDONE-QUINONES
Edward E. Jaffee, Union, and Ronald L. Sweet, Westfield, N.J., assignors to E. I. du Pont de Nemours and Company, Wilmington, Del., a corporation of Delaware
No Drawing. Filed Sept. 17, 1962, Ser. No. 224,251
2 Claims. (Cl. 260—279)

This invention relates to a new and improved process for the production of 2,5-bis(2-carboxyarylamino)benzoquinones. It also relates to a new and improved process for the production of quin(2,3-b)acridine-6,7,13,14(5H,12H)-tetrones, otherwise known as quinacridonequinones, of the formula

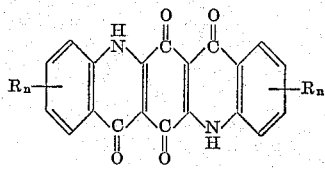

where $n$ is 0–2 and R is from the group consisting of chloro, bromo, fluoro, nitro, methyl, ethyl, propyl, methoxy, ethoxy, and propoxy.

Sharvin (J. Russ. Phys. Chem. Soc., 47, 1260–8 (1915) (CA 9, 3056 (1915))), made quinacridonequinone by the reaction of anthranilic acid with 1,4-benzoquinone to obtain a quinone dianthranilic acid (2,5-bis-(2-carboxyanilino)quinone) which yielded quinacridonequinone on heating with a concentrated sulfuric acid at 200° C. The properties of the compound were well described by Sharvin. Lesnianski (Ber. 51, 695–706 (1918)) reported preparation of quinacridonequinone by heating 2,5-bis-(2-carboxyanilino)quinone with concentrated sulfuric acid at 145–155° C. and studied the product as a vat dye. Japanese Patent 6190 (1951) (CA 47–3576 (1953)) describes the preparation of quinacridonequinone by boiling a mixture of 1,4-benzoquinone and anthranilic acid in acetic acid and heating the product of this reaction at 130° C. with concentrated sulfuric acid. The final product is reported to be soluble in water and to act as a dye, which is contrary to the experience reported by others. Acheson and Sansom, J. Chem. Soc. 1955, 4440, reacted a large excess of benzoquinone with anthranilic acid and its derivatives in ethanol to give the corresponding 2,5-bis(2-carboxyanilino)benzoquinones, some of which were cyclized by heating in sulfuric acid. With anthranilic acid alone the crude yield was 73% (based on the anthranilic acid) of a reddish-black mixture.

All the syntheses of quinacridonequinone reported in the literature inovlve two steps: Step 1 is the formation of 2,5-bis(2-carboxyanilino)quinone (also known as quinone dianthranilic acid) and Step 2 is the condensation of the product of Step 1 to quinacridonequinone by heating with concentrated sulfuric acid.

The literature (F. Kehrmann, Ber. 23, 897 (1890); Acheson and Sansom, J. Chem. Soc. 1955, 4440), indicates that Step 1 may actually be broken down into four sequential parts, the first being the addition of anthranilic acid to 1,4-benzoquinone to form a substituted hydroquinone (I).

EQUATION A

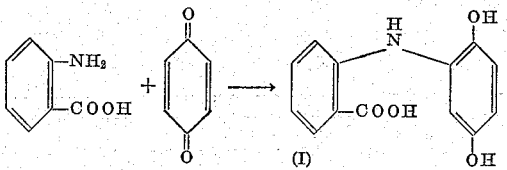

This hydroquinone (I) intially formed is oxidized by the excess 1,4-benzoquinone to give (II)

EQUATION B

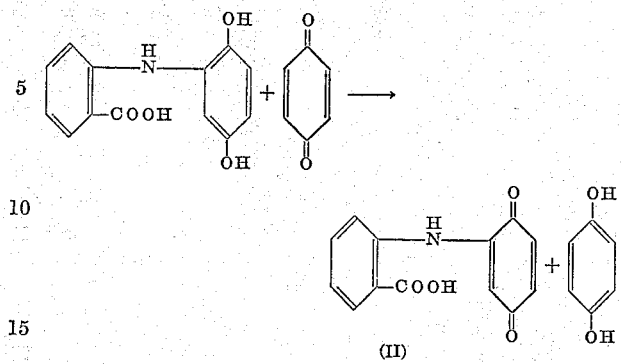

(II) then adds a molecule of anthranilic acid to form the hydroquinone (III)

EQUATION C

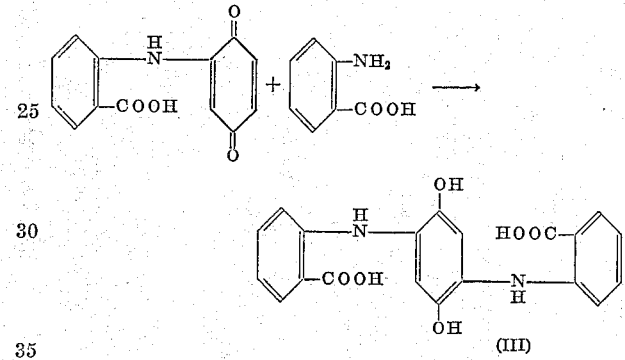

(III) is then oxidized by the excess quinone to 2,5-bis (2-carboxylanilino) benzoquinone (IV)

EQUATION D

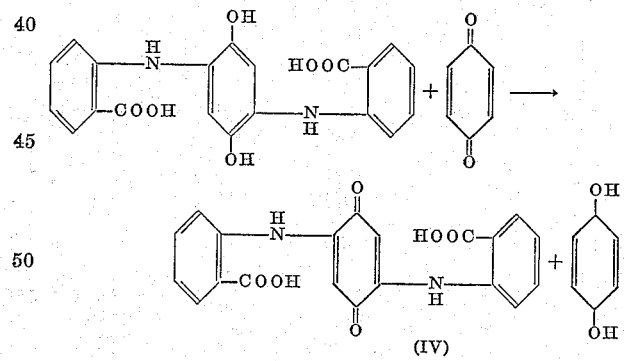

Step 2 is the ring closure of (IV) to quinacridonequinone (V).

EQUATION E

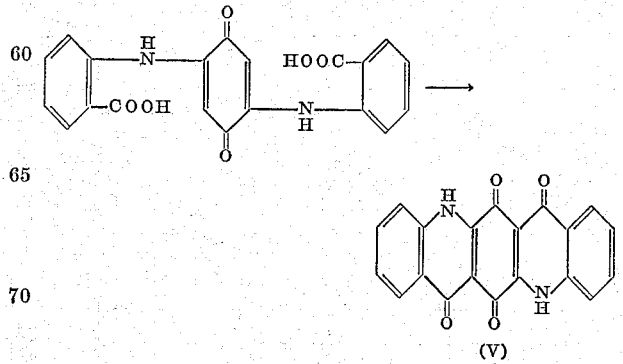

An organic solvent is used as the reaction medium for Step 1 in all the work reported in the literature. Ethyl alcohol is used except in the case of Japanese Patent 6,190 (1951) which reports the use of acetic acid as the reaction medium.

The present invention differs from the processes reported in the literature in a number of respects. One of the principal distinctions is that the present invention provides a process wherein water or a mixture of water and alcohol can be used as the reaction medium in the operation previously described as Step 1. Moreover, hydroquinone, rather than the more expensive benzoquinone, can be used in Step 1. Also, this invention makes it possible to use an oxidant other than benzoquinone in Step 1, thus making all of the benzoquinone available for entering into the structure of the end product. It will be noted from the above equations that in the prior art processes ⅔ of the benzoquinone is used as an oxidizing agent so that at best only ⅓ of this material is available for the formation of the desired end product. Another feature of the present invention is the use of vanadium pentoxide as a catalyst for the reaction of Step 1. Still another feature of the present invention is the purification of the quinacridonequinone end product by an oxidation treatment.

The objects of this invention are accomplished by a process for the preparation of 2,5-bis(2-carboxyarylamino)benzoquinone which involves heating in water benzoquinone and an anthranilic acid of the formula

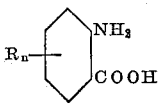

where $n$ is 0–2, both limits being included, and R is selected from the group consisting of lower alkyl, lower alkoxy, and halogen radicals, to produce a 2,5-bis(2-carboxyarylamino)benzoquinone in the water reaction medium.

In a preferred embodiment, the above-described process is carried out in water in the presence of an oxidizing agent such as an alkali metal chlorate using the theoretical 1 mol of benzoquinone with a substantial excess of anthranilic acid. Moreover, the oxidizing agent makes it possible to replace all or part of the benzoquinone employed in the reaction with hydroquinone or quinhydrones, or mixtures thereof. In such an embodiment, where an alkali metal chlorate is used as the oxidizing agent, the water reaction medium should be slightly on the acidic side. A pH of about 2.5 or 5.0 is satisfactory, and a pH of about 2.5 to 3.5 is preferred. This is substantially the pH of an aqueous solution of anthranilic acid but it is advantageous to incorporate a small amount of a weak acid, such as acetic acid into the reaction mixture. It has also been found that vanadium pentoxide is a valuable catalyst for the reaction of this invention.

The 2,5-bis(2 - carboxyarylamino)benzoquinone produced by the reaction of the anthranilic acid with benzoquinone, hydroquinone, or quinhydrone, is usually recovered from the water reaction medium and dried. Such a dried product is suitable for conversion to a quinacridonequinone. This may be accomplished by incorporating the dried material into a cyclizing reaction medium such as concentrated sulfuric acid, polyphosphoric acid or other acidic dehydrating agents and heating such a reaction mixture with stirring, whereupon the 2,5-bis(2-carboxyarylamino)benzoquinone is converted to its corresponding quinacridonequinone. The quinacridonequinone is obtained from hte cyclization reaction mass by the addition of water which precipitates the quinacridonequinone. This product is usually in relatively pure state. However, it is also within the scope of the present invention to effect further purification by refluxing the quinacridonequinone in an acid dichromate solution. Such a solution can be easily formed by the addition of water and sodium dichromate to the sulfuric acid cyclizing reaction medium.

Since it is obvious that many changes and modifications can be made in the above-described details without departing from the nature and spirit of the invention, it is to be understood that the invention is not to be limited to said details except as set forth in the appended claims.

*Example I.—Use of water as reaction medium*

STEP 1.—FORMATION OF 2,5-BIS(2-CARBOXYANILINO) BENZOQUINONE 324 parts (3 mols) of 1,4-benzoquinone is slurried in 6000 parts of water with 274 parts (2 mols) of anthranilic acid. The mixture is then stirred and heated to the boil and refluxed for one hour. It is filtered hot, washed wtih water, then with methanol, and dried at 80° C.

STEP 2.—CYCLIZATION OF 2,5 - BIS(2-CARBOXYANILINO)BENZOQUINONE TO QUINACRIDONEQUINONE

The product of Step 2 is added with stirring to 4200 parts of concentrated sulfuric acid, and heated, with stirring, to 150° C. and kept at that temperature for 30 minutes. The heated solution is then cooled to approximately 10° C., and 560 parts of water are added slowly with vigorous stirring, whereupon a dark brown precipitate is formed. The slurry is then filtered, the precipitate is washed with 3 liters of 80% sulfuric acid, after which it is washed free of acid with hot water and dried at 80° C.

A yield of 295 parts of quinacridonequinone is obtained corresponding to 86% of the theoretical yield based on anthranilic acid or 28.7% based on the benzoquinone used.

STEP 3.—PARTICLE SIZE REDUCTION

The product of Step 2 is useful as a pigment without further processing. However, for optimum pigment properties, it is desirable to reduce the particle size of the product. This can be carried out in a variety of ways known to those skilled in the art. A preferred method for particle size reduction is as follows. 60 parts of the product, with 900 parts of sodium chloride and 11,000 parts of "Cylpebs" (steel rods 1-2″ x 1″) are charged to a ball mill of such size that the complete charge occupies about 60% of the mill volume and the pigment is ground by rotating the mill at about 70% of the critical speed for 12–18 hours, after which the powder is separated from the balls and "Cylpebs" by screening. The powder is slurried in 6000 parts of 5% sulfuric acid solution, the slurry is heated to boiling to dissolve the salt, after which the pigment is separated by filtration, washed free of soluble salts and dried in an oven at 100° C. The dried product is a pigment of dark brown masstone and striking medium yellow tint.

*Example II.—Use of sodium chlorate as an oxidant*

STEP 1.—FORMATION OF 2,5-BIS(2-CARBOXYANILINO) BENZOQUINONE 108 parts (1 mol) of 1,4-benzoquinone is slurried in 6000 parts of water with 274 parts (2 mols) of anthranilic acid. 40 parts of acetic acid is then added with stirring, followed by 279 parts (2.6 mols) of granular sodium chlorate. The mixture is heated to the boil and stirred under reflux (at the boil) for four hours. It is filtered hot, washed with water, then washed with methanol and dried at 80° C. A yield of 290 parts (.76 mol) of 2,5-bis(2-carboxyanilino)benzoquinone is obtained, as a dark brown powder. This corresponds to a yield of 76% of the theoretical based on the benzoquinone used as starting material.

STEP 2.—CYCLIZATION OF 2,5 - BIS(2 - CARBOXYANILINO)BENZOQUINONE TO QUINACRIDONEQUINONE

The product of Step 2 is added with stirring to 4200 parts of concentrated sulfuric acid, then heated with stirring to 150° C. and kept at that temperature for 30 minutes. The mixture is then cooled to approximately 10° C. and 560 parts of water is added slowly, with vigorous stirring, whereupon a dark brown precipitate forms. The resulting slurry is filtered, washed with three liters of 80% sulfuric acid, then washed acid-free with water, and dried at 80° C.

A yield of 247 parts (.72 mol) of quinacridonequinone is obtained as a dark brown powder, and can be reduced to pigment particle size by milling as described in Example I.

The yield obtained corresponds to 72% of the theoretical based on the benzoquinone used, in contrast to the much lower yield (25% of the theoretical) on benzoquinone obtained under like conditions in the absence of the chlorate and acid, or other auxiliary oxidant.

Example III 110 parts (1 mol) of hydroquinone and 4500 parts of water are placed in a suitable agitated vessel equipped for external heating and for boiling under reflux. 3 parts of vanadium pentoxide is then added followed by 330 parts (2.4 mols) of anthranilic acid and then by 80 parts acetic acid (100%). The mixture is heated to the boil and 334 parts (3.14 mols) of sodium chlorate (NaClO$_3$) dissolved in 1500 parts of water is added slowly over a period of 3.5 to 4 hours while maintaining the charge at the boil under reflux. Boiling is continued for about ½ hour after the addition of the oxidant and the charge is then filtered hot, washed free of soluble salts with water and dried at 60° C. to give 375 parts of a dark brown powder bis(carboxyanilino)benzoquinone. This appears to be a substantially quantitative yield but a lower yield after cyclization as follows suggests that there is some unknown impurity present, possibly bis(anilino)benzoquinone, which is removed during cyclization and purification.

*Cyclization.*—300 parts of bis(carboxyanilino)benzoquinone as prepared above is added to 3000 parts concentrated sulfuric acid and the mixture is heated in about 1 hour to 160°–170° C. under good agitation. It is kept at this temperature for about 1 hour and cooled to about 50° C. Then, 4000 parts of water is added slowly (3–4 hours) after which a solution of 300 parts sodium dichromate (Na$_2$Cr$_2$O$_7$·2H$_2$O) in 2500 parts water is added rapidly, the mixture heated to 85° C. and held at about 85° C. for about 2 hours. It is then filtered hot, washed acid free and dried at 60° C. to give 225 parts (83% yield based on hydroquinone) of yellowish orange quinacridonequinone pigment of excellent quality, including high tinting strength and intense hue.

Example IV

STEP 1.—FORMATION OF 2,5-BIS(2-CARBOXYANILINO) BENZOQUINONE 108 parts (1 mol) of 1,4-benzoquinone is slurried in 6000 parts of water with 330 parts (2.4 mols) of anthranilic acid. 80 parts of acetic acid is added with stirring, followed by 279 parts of sodium chlorate and 2.0 parts of vanadium pentoxide. The mixture is stirred and heated to the boil and refluxed at the boil for 15 minutes. It is then filtered hot, washed with water, then washed with methanol and dried at 80° C. A yield of 375 parts of 2,5-bis(2-carboxyanilino)benzoquinone, equal to 99% of the theoretical yield is obtained after only 15 minutes boiling in this case, whereas, in the absence of the catalyst, the reaction proceeds much more slowly so that a yield of only 31% is obtained after 15 minutes of boiling.

STEP 2.—CYCLIZATION

The dry product of the reaction of Step 1 is added with stirring to 4200 grams of concentrated sulfuric acid and heated, with stirring, to 150° C. and kept at that temperature for 30 minutes. The mixture is then cooled and added slowly, with vigorous stirring, to water, and the resulting slurry is filtered, washed free of sulfate with water, and dried at 80° C. A yield of 280 parts of quinacridonequinone is obtained as a dark brown powder. This corresponds to 83% of the theoretical.

STEP 3.—PARTICLE SIZE REDUCTION

The particle size of the product of Step 2 is reduced in particle size as described in Step 3 of Example I. The final product exhibits a dark brown masstone and striking medium yellow tint and is fully equal in pigment quality to the pigment made in the absence of the catalyst.

Example V.—Preparation of a substituted quinacridonequinone

STEP 1.—FORMATION OF 2,5-BIS(2-CARBOXY-4-CHLOROANILINO)BENZOQUINONE 110 parts of hydroquinone is slurried in 6000 parts of water with 411 parts of 2-amino-5-chlorobenzoic acid. 80 parts of acetic acid is added with stirring, followed by 330 parts of sodium chlorate and 3.0 parts of vanadium pentoxide. The mixture is stirred and heated to the boil during 30 minutes and stirred under reflux at the boil for 30 minutes. It is then filtered hot, washed with water, then with methanol, and dried at 80° C. A yield of 400 parts of 2,5-bis(2-carboxy-5-chloroanilino)benzoquinone, corresponding to 90% of the theoretical, is obtained as a dark powder.

STEP 2.—CYCLIZATION

The dry product of the reaction of Step 1 is added with stirring to 4200 grams of concentrated sulfuric acid and heated, with stirring, to 140° C. and kept at that temperature for one hour. The mixture is then cooled and added slowly, with vigorous stirring, to water, and the resulting slurry is filtered, washed free of sulfate with water, and dried at 80° C. A yield of 330 parts of a dark reddish yellow product is obtained which analysis indicates is 2,9-dichloroquinacridonequinone. This corresponds to 80% of the theoretical yield of Steps 1 and 2 combined.

Example VI.—Preparation of a nitro substituted quinacridonequinone

STEP 1.—FORMATION OF 2,5-BIS(2-CARBOXY-5-NITROANILINO)BENZOQUINONE 108 parts (one mol) of 1,4-benzoquinone is slurried in 6000 parts of water with 436 parts (2.4 mols) of 2-amino-4-nitrobenzoic acid. 80 parts of acetic acid is added with stirring followed by 279 parts of sodium chlorate and .12 part of vanadium pentoxide. The mixture is stirred and heated to the boil during 30 minutes and stirred under reflux at the boil for 30 minutes. The slurry is then filtered hot, washed with water, then with methanol, and dried in an oven.

STEP 2.—CYCLIZATION

The product of Step 1 is cyclized by heating with sulfuric acid as described in Example V. A yield of 250 parts of 3,10-dinitroquinacridonequinone is obtained, corresponding to 58% of the theoretical yield.

STEP 3.—PARTICLE SIZE REDUCTION

The particle size is reduced as described in Example I.

Example VII

The procedure of this example is the same as Example V except that 373 parts of 2-amino-5-fluorobenzoic acid is used in place of the 330 parts of 2-amino-5-chlorobenzoic acid, to produce 2,9-difluoroquinacridonequinone.

Example VIII

The procedure of this example is the same as Example VII except that 362 parts of 2-amino-3-methylbenzoic acid is used in place of the 373 parts of 2-amino-5-fluorobenzoic acid, to produce 4,11-dimethylquinacridonequinone.

Similarly, other substituted quinacridonequinones can be prepared by the condensation of an appropriately substituted anthranilic acid with benzoquinone or hydroquinone, and cyclizing the product to quinacridonequinone.

*Example IX*

The procedure of this example is the same as Example III except that cyclization to quinacridonequinone is carried out by heating the product of Step 1 of Example I with 4200 parts of polyphosphoric acid rather than with 4200 parts of concentrated sulfuric acid. Yield and pigment quality are not significantly altered by the change in condensation method.

*Example X*

The procedure of this example is the same as Example III except that an equivalent quantity of chlorosulfonic acid is used in place of sulfuric acid for the cyclization (Step 2).

*Example XI*

The procedure of this example is the same as Example III except that Step 2 is carried out by heating 290 parts of the product of Step 1 with 3000 parts of paratoluene sulfonic acid for 30 minutes at 150° C.

The preferred embodiment of the invention involves heating the quinone or hydroquinone with anthranilic acid and sodium chlorate in a weakly acidic solution. Other alkali metal chlorates which may be used include lithium chlorate, potassium chlorate, and rubidium chlorate.

Proportions are somewhat critical in the process of this invention. It is preferred to use about a 20% excess over the stoichiometric amount of the anthranilic acid compared to the amount of the starting quinone. This requires about 2.4 mols of the anthranilic acid to 1 mol of the starting quinone. The amount of water used can vary widely. It is, of course, realized that there should be sufficient water to form a stirrable mixture and that for practical purposes one would avoid excessively large amounts of water because of the inconvenience in handling. The amount of catalyst used is usually about 0.1–3.0% based on the starting quinone. However, amounts which are on either side of the range are also suitable. The amount of oxidizing agent should be at least equivalent to the theoretical amount required for the oxidations shown in Equations B and D. The preferred amount of sodium chlorate oxidant is 3.0–3.5 mols for each mol of starting quinone. Little advantage is gained by the use of larger quantities.

Anthranilic acids of the general formula

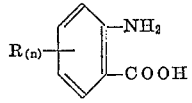

where R is chloro, bromo, fluoro, nitro, ethyl, methyl, propyl, methoxy, ethoxy, and propoxy, and $n$ is 0 to 2, can be used in the process of the invention. When a substituted anthranilic acid is used, a correspondingly substituted quinacridonequinone is obtained, as will be obvious to those skilled in the art. Example V shows the use of 2-amino-5-chlorobenzoic acid to give 2,9-dichloroquinacridonequinone. Example VI shows the preparation of 4,11-dinitroquinacridonequinone from 2-amino-3-nitrobenzoic acid and the use of 2-amino-5-fluorobenzoic acid and 2-amino-3-methylbenzoic acid is shown in Examples VII and VIII, respectively. Other substituted aminobenzoic (anthranilic) acids can be used, such as, for example, 2-amino-3-methoxybenzoic acid, to give 4,11-dimethoxyquinacridonequinone, 2-amino-4,5-dimethylbenzoic acid to give 2,3,9,10-tetramethylquinacridonequinone, and 2-amino-4,5-dimethoxybenzoic acid to give 2,3,9,10-tetramethoxyquinacridonequinone, and others as will be readily apparent to those skilled in the art.

The order of addition of reactants is not critical. It is possible to add all ingredients before boiling but it is preferred to add the oxidant slowly to the boiling mixture of the other ingredients. This rate of addition or the time of heating when all ingredients are present are involved in a series of interrelating variables which includes also the acidity and the choice of ingredient excesses. Anthranilic acid tends to decarboxylate to aniline when heated in water at low acidity (high pH). This tendency is decreased at high acidity (low pH) and by the introduction of alcohol to the medium. On the other hand, high acidity promotes the formation of an anil between a ketone group of the 2,4-bis(o-carboxyanilino)-benzoquinone and the anthranilic acid or aniline present. Such products are black, undesirable impurities. Thus, high acidity promotes the desired reactions of Step 1 (above) but also promotes an undesired and highly objectionable side reaction. On the other hand, low acidity tends to inhibit the desired reaction but to promote decarboxylation of the anthranilic acid compounds.

It is now found that, at a pH not below about 2.5, the desired reactions proceed satisfactorily with a minimum of the formation of the undesired anil within a reaction time of not more than about 4 hours. When the pH does not exceed about 5.0 and, preferably about 3.5, the decarboxylation of anthranilic acid is not excessive within the 4 hour reaction time and can be compensated for by the excess used. The actual time required may be as little as 20 minutes when all ingredients, including the catalyst, are present but a longer period is preferred.

The introduction of some alcohol, as methanol or ethanol, say up to about 50–60% of the total liquid seems to inhibit the by-product reactions to some extent but also to reduce the overall yield perhaps by reducing the effectiveness of the oxidant. Such use seems to give a purer product at reduced yield.

Agitation conditions are not critical nor is the exact temperature of the reaction which may vary as low as about 60° C. to the boil.

The conditions specified for filtration and washing the product of Step 1 are not critical. The conditions specified in the preferred embodiment favor removal of impurities, but an acceptable—but impure—product would be obtained in the absence of any washing. The impurities would carry over into Step 2 and need be removed eventually for optimum pigment quality.

It is desirable to dry the product of Step 1 to avoid excessive dilution of the concentrated sulfuric acid used in Step 2. The temperature of drying is not critical. An undried water-wet presscake can be used if appropriate steps (e.g., use of fuming sulfuric acid) are taken to maintain the sulfuric acid concentration of Step 2 at a level adequate to insure cyclization.

A principal advantage of the new process over the prior art is the use of water as the reaction medium for formation of the 2,5-bis(2-carboxyanilino)benzoquinone. The use of water has marked economic advantages owing to its low cost and the elimination of the need for expensive solvent recovery equipment. Decreased fire hazard and toxicity are also advantages. Another advantage of this invention over the prior art is in the use of low cost inorganic oxidants in place of the more expensive benzoquinone. A still further advantage is the ability to replace benzoquinone by less expensive hydroquinone.

Still another advantage of the new process is the production of a product of markedly improved properties, particularly with respect to freedom from by-products and with respect to the tinctorial properties. The improved products show an outstanding advantage in intensity of color compared to products made by the prior art processes as well as having markedly improved lightfastness.

Since it is obvious that many changes and modifications can be made in the above-described details without departing from the nature and spirit of the invention, it is to be understood that the invention is not to be limited to said details except as set forth in the appended claims.

The embodiments of the invention in which an exclu-

I claim:

1. In a process for the preparation of a quinacridonequinone the steps comprising heating, in water at a pH of about 2.5 to 5 and in the presence of vanadium pentoxide as a catalyst and an alkali metal chlorate as an oxidizing agent, a quinone compound selected from the group consisting of benzoquinone, hydroquinone, quinhydrone, and mixtures thereof with an anthranilic acid of the formula

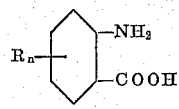

where $n$ is 0–2, both limits being included, and R is selected from the group consisting of lower alkyl, lower alkoxy, and halogen, the molar proportion of the anthranilic acid to the quinone compound being about 2.4:1, recovering a 2,5-bis(2-carboxyarylamino)benzoquinone from the water, cyclizing the latter compound in concentrated sulfuric acid to form a quinacridonequinone, and then purifying said quinacridonequinone by refluxing in an acid dichromate solution.

2. The process of claim 1 wherein the oxidizing agent is sodium chlorate, the starting quinone compound is hydroquinone, $n$ in the structural formula is zero, and the pH is from 2.5 to 3.5.

References Cited by the Examiner

UNITED STATES PATENTS

| | | | |
|---|---|---|---|
| 1,544,441 | 6/25 | Frohlich | 260—396 |
| 1,575,679 | 3/26 | Frohlich | 260—396 |
| 2,267,741 | 12/41 | Langbein | 260—396 |
| 2,821,529 | 1/58 | Struve | 260—279 |
| 2,821,530 | 1/58 | Struve | 260—279 |
| 3,124,582 | 3/64 | Jaffe | 260—279 |

OTHER REFERENCES

Nishida: Chem. Abstracts, vol. 47, column 3576 (1953), abstract of Japanese Patent 26–6190 (1951).

Sharvin: Chem. Abstracts, vol. 9, column 3056 (1915), abstract of J. Russ. Phys. Chem. Soc., vol. 47, pp. 1260–8 (1915).

U.S. Publications Board, Report No. 70,339, Frames 11311–3 (1935).

IRVING MARCUS, *Primary Examiner.*

NICHOLAS S. RIZZO, WALTER A. MODANCE, *Examiners.*